United States Patent [19]
Goettsch

[11] Patent Number: 5,858,147
[45] Date of Patent: Jan. 12, 1999

[54] METHOD OF MAKING A REINFORCING FABRIC FOR POWER TRANSMISSION BELTS

[75] Inventor: Larry Dean Goettsch, Lincoln, Nebr.

[73] Assignee: The Goodyear Tire & Rubber Company, Akron, Ohio

[21] Appl. No.: 839,520

[22] Filed: Apr. 14, 1997

[51] Int. Cl.⁶ .............................. D06C 89/00; F16G 7/02
[52] U.S. Cl. .................... 156/137; 156/139; 156/226; 156/227; 152/528; 152/529; 152/533; 139/DIG. 1; 474/262; 474/266
[58] Field of Search .................... 156/137, 139, 156/141, 226, 227, 117, 194, 195, 425; 152/533, 528, 529; 139/DIG. 1; 474/267, 265, 262; 442/218

[56] References Cited

U.S. PATENT DOCUMENTS

| | | |
|---|---|---|
| 2,982,327 | 5/1961 | Vanzo et al. . |
| 3,515,621 | 6/1970 | Watson . |
| 4,635,696 | 1/1987 | Gasowski et al. . |
| 5,068,000 | 11/1991 | Lauderdale . |
| 5,425,985 | 6/1995 | Irvin . |
| 5,536,554 | 7/1996 | Wall . |

*Primary Examiner*—Michael W. Ball
*Assistant Examiner*—Sam Chuan Yao
*Attorney, Agent, or Firm*—Marc R Dion, Sr.; Nancy T Krawczyk

[57] ABSTRACT

A method of making a reinforcing fabric having wide angles between the warp yarns and the weft yarns by helically folding on itself a strip of fabric which has been skewed such that the angle $\alpha$ between the warp yarns and the weft yarns is from 100° to 140°.

4 Claims, 3 Drawing Sheets

METHOD OF MAKING A REINFORCING FABRIC FOR POWER TRANSMISSION BELTS

BACKGROUND OF THE INVENTION

The present invention is directed to a reinforcing material employed in the production of industrial products such as power transmission belts and the like and a method of producing such a reinforcing material.

FIELD OF THE INVENTION

In connection with the manufacture of endless power transmission belts, such as V-belts, gear belts, and the like, it is conventional to utilize a construction of fabric reinforced rubber or other elastomer. Typically, the belt structure includes a cord winding layer, which is located along the "neutral" axis of the belt. Cross-sectional areas of such belts above and below the neutral axis are subject to flexing in tension and/or compression. In a typical endless belt, for example, outer portions of the belt cross-section are flexed in tension, as the belt passes around the sheaves over which it is trained. The inner cross-sectional portions of the belt are subject to flexing in compression. For some installations, a single belt may be required to pass over both internal and external sheaves, such that both the inner and outer cross-sectional portions thereof are flexed in both tension and compression.

In a transmission belt of conventional construction, it is a known practice to incorporate as a protective cover and/or reinforcement, a bias-cut woven textile fabric, e.g., a woven fabric having its warp and weft threads disposed at an angle to its longitudinal axis, which may have been previously coated and impregnated with an uncured, tacky, elastomeric compound, such as a synthetic rubber. It has been customary to utilize bias-type fabric for the reinforcing material, so that the yarns of the fabric do not extend parallel to the longitudinal axis of the belt, but rather are arranged at angles thereto. By incorporating such strips of reinforcing fabric into the elastomeric material of the belt, either in the inner, outer or both cross-sectional areas of the belt, stability is imparted to the belt's geometry.

Pursuant to prior practice, the manufacture of bias-type reinforcing has been extremely labor intensive and, therefore, costly, and at the same time less than optimally effective for the purpose. In one commonly used procedure, for example, tubular woven fabric is slit along a spiral at an angle of about 15° to the longitudinal axis of the fabric tube. The continuous strip resulting from the bias slitting of the tube has its yarns disposed asymmetrically with respect to the longitudinal axis of the fabric strip. The slit fabric strip is thereafter elongated to reorient the yarns, in an effort to align them approximately at a relative angle of about 120° symmetrical to the longitudinal axis of the spliced length. That assembled length is later slit into narrow strips appropriate to the desired end use.

An improvement over the aforementioned process is disclosed in U.S. Pat. No. 5,068,000 entitled "Method Of Making A Reinforcing Fabric For Power Transmission Belts, Hoses, And The Like". According to the process disclosed in that patent, the reinforcing fabric is not woven in tubular form, but is woven in flat form, advantageously on a high speed shuttleless machine. The woven starting material is more or less conventional in form, advantageously being of a poly-cotton composition. The particular yarn composition and fabric makeup can be varied to suit the requirements of the end user. The conventionally flat woven fabric is further processed pursuant to the invention of the aforementioned patent to impart thereto a significant bias construction. That is, the weft yarns are caused to be disposed at a substantial angle to the longitudinally extending warp yarns. It is also seen, when viewed from the perspective of the belt direction, that an angle of approximately 120° exists between the warp yarns and the weft yarns. By belt direction, it is meant that when a final commercial product is produced, the tension which is placed on the belt will be in the direction of the belt direction.

However, the belt direction is at a substantial angle with respect to the weaving direction. As a result of that, the width of the material is limited. In typical processes, the width of the material may be approximately 60 inches before skewing and approximately 54 inches after skewing. Thus, if the belt manufacturer is constructing a belt less than 54 inches, the material will be of sufficient length. However, if a belt of greater than 54 inches is required, then it is necessary to cut and splice the material to provide a reinforcement fabric of sufficient length. As is known in the art, banner cuts are typically employed requiring a splice. to construct a material of sufficient length having the desired characteristics along its entire length. However, at each splice, there is an irregularity in the fabric which causes an interruption in the smooth operation of the transmission belt. Accordingly, it is desirable to construct a material for reinforcing power transmission belts which eliminates the need for all splices, except the single splice needed to make an endless belt.

U.S. Pat. No. 2,982,327 discloses a method of making a belt reinforcement for a tire by twisting an assembly of threads or tire cord into a tube form and passing it through a pair of rollers to flatten it into a two-ply reinforcement wherein the tire cords are oriented in adjacent layers at opposite angles of 45°, stating that this structure does not display the defects or disadvantages of the so-called "square fabrics", namely, those characterized by a warp and a weft.

It is believed that the fill yarns in a tire cord fabric do not give the fabric much stability. The leno tire fabrics used in the present invention have warp and weft yarns which are interconnected to give the fabric stability even when distorted to a wide angle.

U.S. Pat. No. 5,536,554 discloses a fibrous web fabric for reinforcing power transmission belts and a method of producing such a fabric. The reinforcing fabric is comprised of a first fibrous web having minimal warp yarns. The filler material is oriented at a desired right lead. A second fibrous web is provided which has minimal warp yarns. The filler material is oriented at a desired left lead. The first and second fibrous webs are interconnected either mechanically, chemically, or both, so that an angle of between 178° and 60° is formed between the filler material of the first fibrous web and the filler material of the second fibrous web when viewed in the direction of tension on the power transmission belt.

The problem with this latter solution is that the presence of two layers of warp yarns running in the belt direction creates what is known in the art as a beam effect. The two layers going around a pulley do not stretch enough to flex around the pulley. One layer must compress while the other one acts like the load carrying layer, therefore, a belt made with this type of fabric would be stiff and not flex around a pulley properly.

SUMMARY OF THE INVENTION

In accordance with the practice of the present invention, there is provided a method for producing a fabric having a wide angle between the warp yarns and the weft yarns comprising:

a) providing a strip of leno type fabric of a predetermined width having warp yarns and weft yarns;

b) skewing the fabric strip so that the angle between the warp yarns and the weft yarns is from 100° to 140°; and c) helically folding the strip upon itself with edges butted or slightly overlapped to provide a two-layered fabric strip with an angle between the warp yarns and the weft yarns in the longitudinal direction of the folded strip of from 100° to 140°.

DETAIL DESCRIPTION

Figure 4:
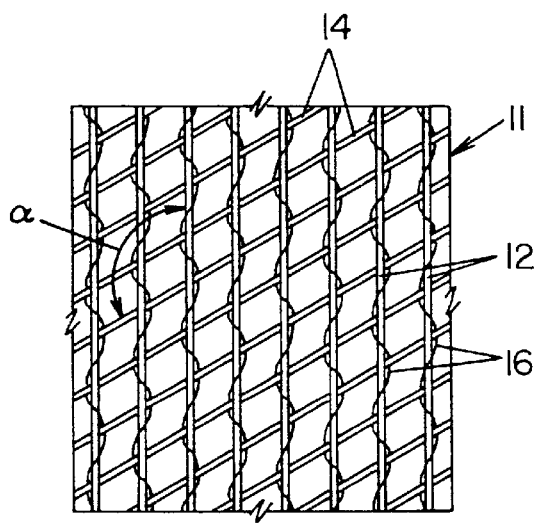
FIG. 4 is a plan view of a Liba leno weave after skewing.

According to the invention, a strip of fabric 11, 13 having warp yarns 12, weft yarns 14 and in the case of a Liba leno weave 11, stitching yarns 16 and having a predetermined width is skewed, FIG. 4, until the angle α between the warp yarns 12 and the weft yarns 14 is between 100° and 140°. Preferably, the angle α is between 115° and 125°. Ideally the angle α is 120°.

Figure 1:
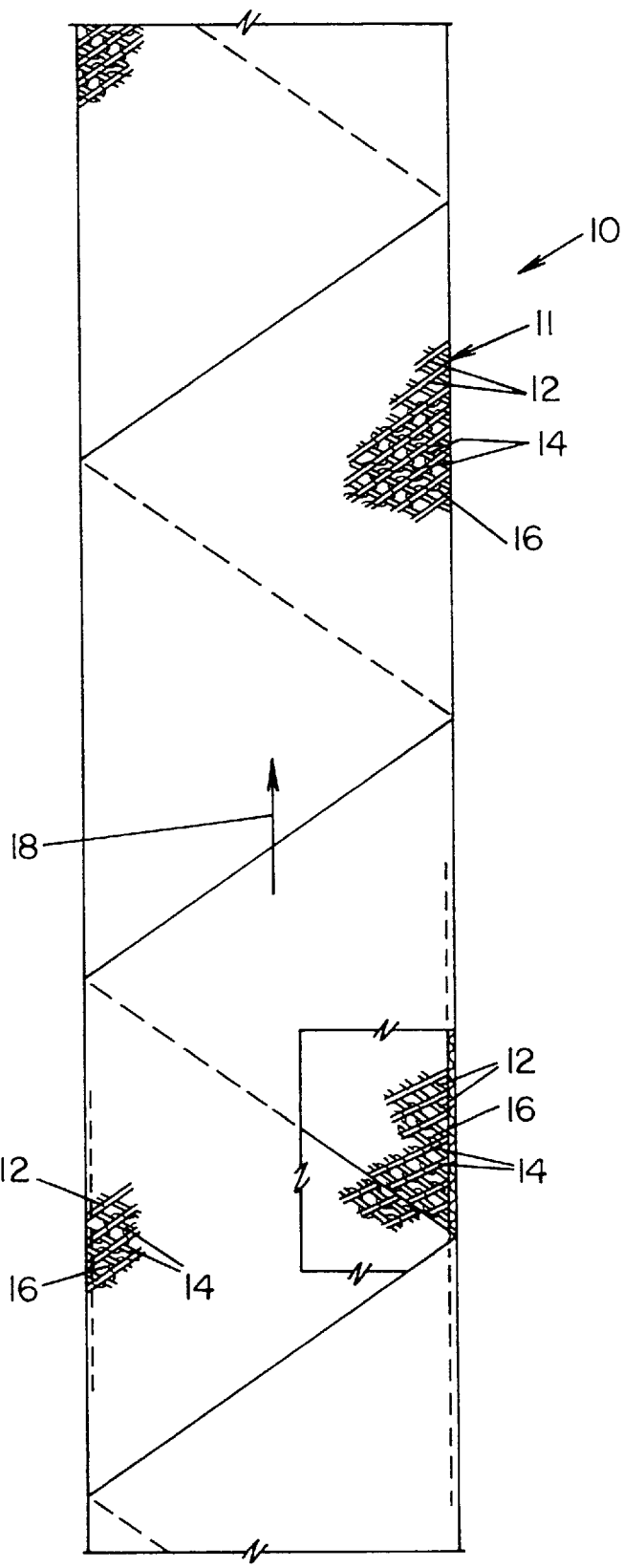
FIG. 1 is a plan view of the strip of fabric produced by the method of the invention.
Figure 2:
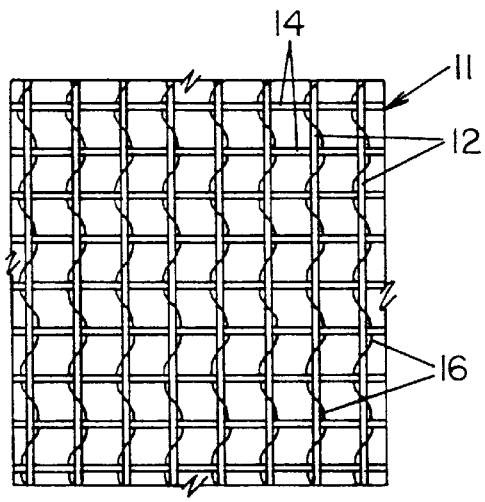
FIG. 2 is a plan view of a leno weave made on a Liba machine used as a starting fabric.
Figure 3:
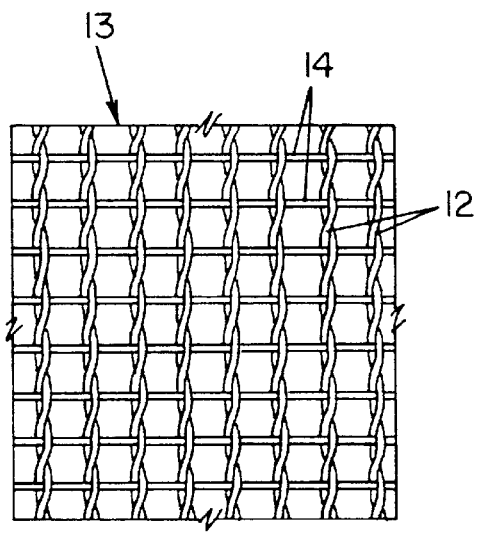
FIG. 3 is a plan view of a full leno weave used as an alternate embodiment of the starting fabric.
Figure 5:
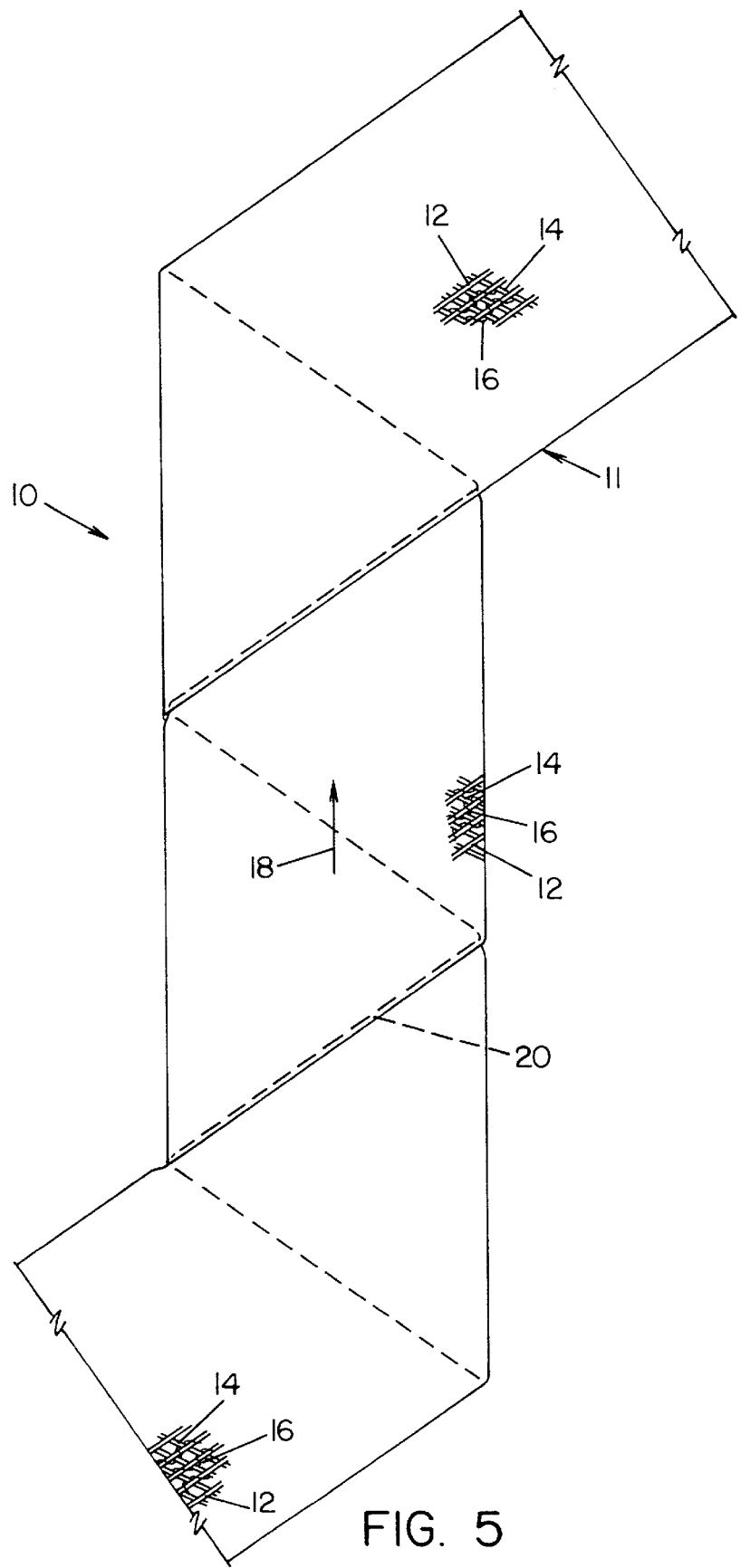
FIG. 5 is a plan schematic view of the skewed fabric partially folded.

The fabric strips 11, 13 can be treated with an adhesive, e.g. an RFL dip either prior to skewing or after. Following skewing, the fabric strip is helically folded on itself as illustrated in FIGS. 1 and 5 to give a strip of two-ply fabric 10 with edges butted or slightly overlapped as shown at 20.

The resulting angle of the yarns is bisected by arrow 18 indicating the belt direction at which the endless strip 10 would be used either as a reinforcement layer or a belt wrap.

Other methods can be used to hold the two plies together such as sewing with stitch yarns, needle punching or including heat meltable yarns in the fabric.

As can be appreciated, there are no yarns running the belt direction which would create stiffness and loss of flexibility for the belts to go around pulleys.

While certain representative embodiments and details have been shown for the purpose of illustrating the invention, it will be apparent to those skilled in this art that various changes and modifications may be made therein without departing from the spirit or scope of the invention.

What is claimed is:

1. A method for producing a fabric having a wide angle between warp yarns and weft yarns comprising:

a) providing a strip of leno fabric of a predetermined width having warp yarns and weft yarns;

b) skewing the fabric strip so that the angle between the warp yarns and the weft yarns is from 100° to 140°; and c) helically folding the strip upon itself with edges butted or slightly overlapped to provide a two-layered fabric strip with an angle between the warp yarns and the weft yarns in the longitudinal direction of the folded strip of from 100° to 140°.

2. The method according to claim 1 wherein the warp yarns and the weft yarns are skewed at an angle α from 115° to 125°.

3. The method according to claim 2 wherein the angle α is 120°.

4. The method according to claim 1 further including the step of treating the fabric strip with an adhesive either prior to or after skewing.

\* \* \* \* \*